UNITED STATES PATENT OFFICE.

WILLIAM J. COOPER, OF WESTMINSTER, COUNTY OF MIDDLESEX, ENGLAND.

PROCESS OF DISTILLATION OF COAL.

SPECIFICATION forming part of Letters Patent No. 282,440, dated July 31, 1883.

Application filed March 15, 1883. (No specimens.) Patented in England June 2, 1882, No. 2,611, and November 30, 1882, No. 5,713; in France December 2, 1882; in Belgium December 4, 1882, No. 59,731, and in Germany December 6, 1832.

*To all whom it may concern:*

Be it known that I, WILLIAM JOHN COOPER, a subject of the Queen of Great Britain, and residing at Westminster Chambers, Westminster, in the county of Middlesex, England, have invented certain Improvements in the Distillation of Coal, (for which I have obtained patents in Great Britain, No. 2,611, dated June 2, 1882, and No. 5,713, dated November 30, 1882, and in Belgium, No. 59,731, dated December 4, 1882, and in France, dated December 2, 1882, and for which application has been made in Germany December 5, 1882,) of which the following is a specification.

My invention relates to an improvement in the distillation of coal for the manufacture of illuminating and other gas; and the object of my invention is to so carry out the process as to produce an increased quantity of ammonia and ammoniacal products, an increased yield of illuminating-gas, and a diminution of the impurities in the gas as it leaves the retort. This object I attain by thoroughly mixing lime in one of its various forms with the coal, in about the proportion of one part of lime to forty of coal, and distilling the mixture, as hereinafter more fully set forth.

I take the lime in the condition of hydrate of lime, or slaked lime or quicklime, or carbonate of lime or chalk, or spent lime, or mixtures of the same, and I add it to the coal in the proportion of about half a hundred-weight of the lime to a ton of coal. The coal may be in the lumpy condition in which it is ordinarily used for gas-making; but I prefer to have it in a finely-divided state. The lime is thoroughly mixed with the coal, and the mixture is then ready to undergo distillation in gas-retorts, coke-ovens, or furnaces. When I distill the mixture in gas-retorts in gas-works, I find it convenient to take quicklime, and I slake the lime with about its own weight of water, whereby it is brought into such condition as to be readily mixed with the coal.

The small coal or "slack," which has comparatively little commercial value as coal, is especially available in carrying out my invention.

Some of the advantages resulting from my improvement are that I thereby obtain an increased yield of ammonia and ammoniacal products; an increased yield of those compounds which impart illuminating power to the gas, and consequently an increased yield of illuminating-gas; a diminution of the impurities in the crude gas—that is, in the gas as it leaves the retort—and consequently a diminution of the cost of gas purification; an improvement in the resultant coke.

I am aware that it is not new to combine lime with coal in the manufacture of gas. This has long been known, and is described in Haddock's British Patent, No. 4,365 of 1819, and Leslie's British Patent, No. 2,604 of 1858; but processes was very much greater than in my the proportion of lime to the coal used in such improvement.

I believe it to be new to combine the lime with the coal in about the proportions described, resulting in the improvements or advantages set forth.

The thorough admixture of the lime with the coal in the retort produces a powerful and persistent alkaline reaction; but the proportion of lime employed is so small as not seriously to lower the calorific value of the coke, and it is owing to the proportions used that the results claimed for my improvement are attained.

I claim as my invention—

As an improvement in the art of making gas, the mode herein described of obtaining improved products, said mode consisting in mixing lime with the coal, in about the proportion of half a hundred-weight of lime to the ton of coal, and distilling the mixture, substantially as set forth.

In testimony whereof I have signed my name to this specification in the presence of two subscribing witnesses.

WILLIAM JOHN COOPER.

Witnesses:
   CHAS. MILLS,
   CHAS. JAS. JONES,
   *Both of 47 Lincoln's Inn Fields, London.*